United States Patent
Song et al.

(10) Patent No.: US 11,556,792 B2
(45) Date of Patent: Jan. 17, 2023

(54) METHOD AND APPARATUS FOR PREDICTING PERFORMANCE OF VEHICLE NVH SYSTEM BASED ON DEEP LEARNING

(71) Applicants: HYUNDAI MOTOR COMPANY, Seoul (KR); KIA MOTORS CORPORATION, Seoul (KR)

(72) Inventors: Dae Hun Song, Bucheon-si (KR); Moon Seok Lee, Hwaseong-si (KR); Young Kwan Ahn, Seoul (KR); Eun Jun Han, Hwaseong-si (KR); Sang Beom Park, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 182 days.

(21) Appl. No.: 17/091,348

(22) Filed: Nov. 6, 2020

(65) Prior Publication Data
US 2021/0383211 A1   Dec. 9, 2021

(30) Foreign Application Priority Data

Jun. 8, 2020   (KR) .................. 10-2020-0069013

(51) Int. Cl.
*G06N 3/08*   (2006.01)
*G07C 5/08*   (2006.01)

(52) U.S. Cl.
CPC ............. *G06N 3/08* (2013.01); *G07C 5/0808* (2013.01)

(58) Field of Classification Search
CPC ........ G06N 3/08; G06N 3/084; G06N 3/0454; G06N 3/082; G06N 3/04; G07C 5/0808; G06Q 10/04; G06Q 10/0639; G10K 11/17821

See application file for complete search history.

(56) References Cited

U.S. PATENT DOCUMENTS

| | | | |
|---|---|---|---|
| 10,991,142 B1 * | 4/2021 | Harrison | G06N 3/08 |
| 11,256,921 B2 * | 2/2022 | Timor | G06V 10/56 |
| 2020/0242471 A1 * | 7/2020 | Busch | G06K 9/6273 |

* cited by examiner

*Primary Examiner* — Joseph J Dallo
(74) *Attorney, Agent, or Firm* — Morgan, Lewis & Bockius LLP

(57) ABSTRACT

A method for predicting performance of a vehicle NVH system based on deep learning is provided. The method includes preprocessing learning data collected for each channel associated with noise and vibration while driving, learning a model forming a correlation function between multiple inputs and multiple outputs corresponding to the preprocessed learning data using an artificial neural network, and predicting performance using a vehicle NVH system model formed through the learned model.

20 Claims, 7 Drawing Sheets

METHOD AND APPARATUS FOR PREDICTING PERFORMANCE OF VEHICLE NVH SYSTEM BASED ON DEEP LEARNING

CROSS-REFERENCE TO RELATED APPLICATION

This application claims the benefit of priority to Korean Patent Application No. 10-2020-0069013, filed in the Korean Intellectual Property Office on Jun. 8, 2020, the entire contents of which are incorporated herein by reference.

TECHNICAL FIELD

The present disclosure relates to a vehicle noise, vibration and harshness (NVH) system, and more particularly, relates to technologies of predicting the performance of the vehicle NVH system based on deep learning using an artificial neural network.

BACKGROUND

Vehicle noise, vibration and harshness (NVH) is a term referring to all phenomena of vibration and noise of vehicles.

Noise refers to a loud sound, which is displayed in decibel (dB), making the human emotion unpleasant, and is roughly classified as interior noise generated by vehicle parts and exterior noise generated from the outside of the vehicle.

Vibration refers to a vibration phenomenon where the vehicle body shakes at a certain period and is caused by a result according to repeated movement of kinetic energy and potential energy. Vibration may roughly include interior vibration due to an operation of an internal part such as an engine and exterior vibration transferred to the vehicle through the vehicle body, a tire, or a suspension from friction with the road surface, the wind, and the like.

Harshness refers to noise and vibration by an irregular impact when the vehicle drives over speed bumps installed on the road or drives across railroad tracks.

NVH is an importance element for determining emotional quality of the vehicle. The previous NVH research aims to make quiet vehicles by simply reducing sounds and vibration. Recently, an NVH research evolves in the direction of implementing sounds which are emotional and have good sound quality and making frequencies or waveforms of sounds giving the driver pleasure.

There are roughly an analytic method and an experimental access method as conventional techniques for predicting vehicle NVH performance. A representative analytic method is a finite element method (FEM). A representative experimental access method is transfer path analysis (TPA) for identifying a transfer path of noise based on a frequency response function (FRF).

However, such techniques are high in accuracy in a simple system, whereas they include various types of bushes and are low in accuracy in a complex system which is made through welding and various assembling processes. Furthermore, because it is difficult for the above-mentioned techniques to accurately reflect a non-linear characteristic on a frequency domain which is varied for each given driving situation and condition, reliability for performance evaluation is more degraded.

SUMMARY

The present disclosure has been made to solve the above-mentioned problems occurring in the prior art while advantages achieved by the prior art are maintained intact.

An aspect of the present disclosure provides a method for establishing a vehicle NVH system model and predicting performance of a vehicle NVH system based on deep learning.

Another aspect of the present disclosure provides a method for establishing a vehicle NVH system model and predicting performance of a vehicle NVH system based on deep learning, which is capable of minimizing waste of data by applying all driving data to learning and providing an efficient, data-friendly vehicle NVH system model by reflecting non-linear characteristics in a driving state, and an apparatus therefor.

Another aspect of the present disclosure provides a method for establishing a vehicle NVH system model, which is capable of providing an NVH system model indicating a vehicle characteristic and/or a part characteristic using data upon driving without a process of previously checking characteristics of each of transfer paths.

Another aspect of the present disclosure provides a method for establishing a vehicle NVH system model and predicting performance of a vehicle NVH system, which is capable of quickly and simply identifying characteristics and performance of the entire vehicle NVH system through one monitoring.

Another aspect of the present disclosure provides an integrated performance model user interface for learning a vehicle NVH system model through fusion interpretation of an analytic technique and an experimental technique and performing performance prediction for the learned model once.

The technical problems to be solved by the inventive concept are not limited to the aforementioned problems, and any other technical problems not mentioned herein will be clearly understood from the following description by those skilled in the art to which the present disclosure pertains.

According to an aspect of the present disclosure, a method for predicting performance of a vehicle NVH system based on deep learning may include preprocessing, by a preprocessing device, learning data collected for each channel associated with noise and vibration while driving, learning, by a learning device, a model forming a correlation function between multiple inputs and multiple outputs corresponding to the preprocessed learning data using an artificial neural network, and predicting, by a prediction device, performance using a vehicle NVH system model established through the learned model.

As an embodiment, the preprocessing may include receiving a first user input to set an order where at least one learning target channel selected among all channels is preprocessed, generating one learning dataset where the learning data corresponding to the selected learning target channel is configured with an input and an output on a frequency domain in the set order and storing the learning dataset as a file, and outputting a color map of a channel selected by the user based on the generated learning dataset.

As an embodiment, the artificial neural network may be a deep neural network (DNN) including a plurality of hidden layers between an input layer and an output layer. The learning of the model may include receiving a second user input to set a default hyperparameter including a model structure variable, receiving a third user input to set an additional hyperparameter including a learning algorithm, receiving a fourth user input to specify a default folder to store the learned result, performing learning as a learning start button is input, and storing the learned vehicle NVH system model. The model structure variable may include the number of the hidden layers, the number of hidden nodes, and learning variables.

As an embodiment, paths of a noise source and a vibration source may be divided and learned to the Nth hidden layer of the artificial neural network and may be combined and learned from the (N+1)th hidden layer, when both the noise source and the vibration source are included in the input layer.

As an embodiment, the N may be a value greater than 2.

As an embodiment, each of the noise source and the vibration source may include a frequency as one variable.

As an embodiment, the vehicle NVH system model may include a selectable separate performance model, an integrated performance model, and a universal deep learning model.

As an embodiment, the separate performance model may include an acceleration booming model and a road noise model.

As an embodiment, the method may further include at least one of visualizing and outputting the result of predicting the performance as a color map on a frequency domain and visualizing and outputting the result of comparing an experimental result obtained by applying the same noise and vibration as the collected learning data to a real vehicle with the result of predicting the performance.

As an embodiment, the predicting of the performance using the vehicle NVH system model established through the learned model may include loading a test dataset, receiving a fifth user input to specify an order of prediction channels for all channels corresponding to the test dataset, generating and storing a test dataset in the order of the prediction channels, loading the vehicle NVH system model specified by the user and predicting the performance using the vehicle NVH system model, and storing the result of predicting the performance.

According to another aspect of the present disclosure, an apparatus for predicting performance of a vehicle NVH system based on deep learning may include a preprocessing device that preprocesses learning data collected for each channel associated with noise and vibration while driving, a learning device that learns a model forming a correlation function between multiple inputs and multiple outputs corresponding to the preprocessed learning data using an artificial neural network, and a prediction device that predicts performance using a vehicle NVH system model established through the learned model.

As an embodiment, the preprocessing device may include a preprocessing order determining device that receives a first user input to set an order where at least one learning target channel selected by the user among all channels is preprocessed, a preprocessing dataset generator that generates one learning dataset where the learning data corresponding to the selected learning target channel is configured with an input and an output on a frequency domain in the set order and stores the learning dataset as a file, and a preprocessing result output device that outputs a color map of a channel selected by the user based on the generated learning dataset.

As an embodiment, the artificial neural network may be a deep neural network (DNN) including a plurality of hidden layers between an input layer and an output layer. The learning device may include a first setting device that receives a second user input to set a default hyperparameter including a model structure variable, a second setting device that receives a third user input to set an additional hyperparameter including a learning algorithm, a folder specifying device that receives a fourth user input to specify a default folder to store the learned result, a performance device that performs learning as a learning start button is input, and a storage storing the learned vehicle NVH system model. The model structure variable may include the number of the hidden layers, the number of hidden nodes, and learning variables.

As an embodiment, paths of a noise source and a vibration source may be divided and learned to the Nth hidden layer of the artificial neural network and may be combined and learned from the (N+1)th hidden layer, when both the noise source and the vibration source are included in the input layer.

As an embodiment, the N may be a value greater than 2.

As an embodiment, each of the noise source and the vibration source may include a frequency as one variable.

As an embodiment, the vehicle NVH system model may include a selectable separate performance model, an integrated performance model, and a universal deep learning model.

As an embodiment, the separate performance model may include an acceleration booming model and a road noise model.

As an embodiment, the apparatus may further include a visualization device that includes a predicted result output device that visualizes and outputs the result of predicting the performance as a color map on a frequency domain and a compared result output device that visualizes and outputs the result of comparing an experimental result obtained by applying the same noise and vibration as the collected learning data to a real vehicle with the result of predicting the performance.

As an embodiment, the prediction device may include a loading device that loads a test dataset, a prediction order determining device that receives a fifth user input to specify an order of prediction channels for all channels corresponding to the test dataset, a test dataset generator that generates and stores a test dataset in the order of the prediction channels, a prediction performing device that loads the vehicle NVH system model specified by the user and predicts the performance using the vehicle NVH system model and a prediction result storing device that stores the result of predicting the performance.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
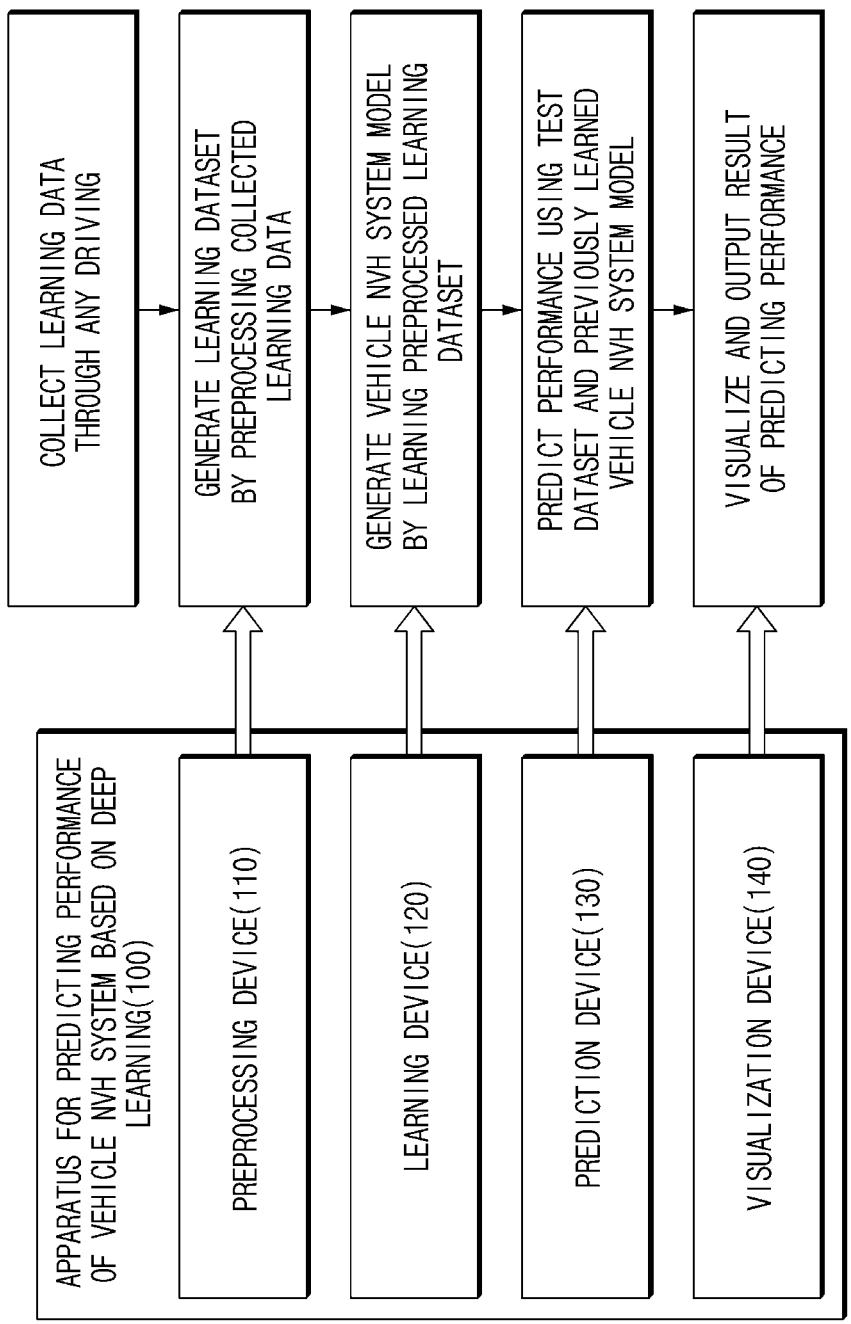
FIG. 1 is a block diagram illustrating a structure of an apparatus for predicting performance of a vehicle NVH system based on deep learning according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure will be described in detail with reference to FIGS. 1 to 7.

FIG. 1 is a block diagram illustrating a structure of an apparatus for predicting performance of a vehicle NVH system based on deep learning according to an embodiment of the present disclosure.

Hereinafter, for convenience of description, an apparatus 100 for predicting performance of a vehicle NVH system based on deep learning will be described as being called the apparatus 100 for predicting the performance.

An NVH system model using an artificial neural network may be roughly composed of a noise source and a vibration source, a transfer system which is a trimmed body for transferring noise and vibration, and a response which is vehicle interior noise and vibration.

As an example, the source may include engine noise, intake/exhaust noise, tire noise, vibration at the powertrain body, and street vibration.

The transfer system may be implemented through an NVH deep neural network (DNN) model which is an artificial neural network. The response may include front/rear seat noise, front/rear seat floor vibration, and the like.

Referring to FIG. 1, the apparatus 100 for predicting the performance may include a preprocessing device 110, a learning device 120, a prediction device 130, and a visualization device 140.

The preprocessing device 110 may preprocess learning data collected for each channel associated with noise and vibration during any driving for a long time to generate a learning dataset.

The preprocessing device 110 may obtain an autopower spectrum at each channel and each time through fast Fourier transform (FFT) and may configure each separate data as one big learning data.

As an example, respective points at the same point on a color map may be combined into one dataset, and datasets may be generated by a number obtained by multiplying the number of frequency variables by the number of time variables on the color map. Herein, a size of the dataset may be determined according to a frequency domain, a time domain, a frequency resolution, and a time resolution.

As an example, the dataset may be configured in an order of a frequency, an input (e.g., a first noise source, a second noise source, . . . , a first vibration source, a second vibration source, a third vibration source, . . . ), and an output (e.g., front seat noise).

As another example, the dataset may be configured in an order of a frequency, a time, an input (e.g., a first noise source, a second noise source, . . . , a first vibration source, a second vibration source, a third vibration source, . . . ), and an output (e.g., front seat noise or rear seat noise).

Any driving data for establishing a DNN model may be big data measured while driving for a long time by reflecting various driving situations.

As an example, the any driving condition may be, but is not limited to, various patterns of acceleration and deceleration driving over 10 minutes, in which various road surfaces, bumps, or the like are reflected.

The learning device 120 may learn a model forming a correlation function between multiple inputs and multiple outputs corresponding to the preprocessed learning data using an artificial neural network.

As an example, the artificial neural network may be a deep neural network (DNN) including a plurality of hidden layers between an input layer and an output layer.

The prediction device 130 may perform NVH performance prediction using a test dataset selected from the learning dataset and the vehicle NVH system model established through the learned model.

In other words, the prediction device 130 may apply test input values to the learned model to predict a test output value.

The visualization device 140 may visualize and output the result of predicting the performance as a color map on a frequency domain.

Furthermore, the visualization device 140 may compare an experimental result obtained by applying the same noise and vibration as the collected learning data to a real vehicle with the result of predicting the performance and may visualize and output the compared result.

As an example, the visualization device 140 may visualize and output prediction performance for booming, road noise, accelerated transmission noise and vibration, or the like.

The vehicle NVH system model may include a trimmed body model, a suspension model, a subframe model, an engine mount model, a seat model, or the like.

The apparatus 100 for predicting the performance of the vehicle NVH system based on the deep learning according to an embodiment of the present disclosure may store a large amount of data—for example, data of 4 GB or more—collected during any driving for a long time as the learned model, thus needing a small memory space of 100 KB or less.

Furthermore, the apparatus 100 for predicting the performance of the vehicle NVH system based on the deep learning according to an embodiment of the present disclosure may receive a virtual vibration source, may virtually continue to evaluate improvement through NVH performance prediction, and may analyze the sensitivity of input on output.

Furthermore, the apparatus 100 for predicting the performance of the vehicle NVH system based on the deep learning according to an embodiment of the present disclosure may replace the vehicle NVH system model which is difficult to be physically established in interpretation with a learning model.

Furthermore, the apparatus 100 for predicting the performance of the vehicle NVH system based on the deep learning according to an embodiment of the present disclosure may provide an experiment replacement means, when it is difficult to directly experiment. As an example, when a powertrain of another company is applied to the trimmed body according to an embodiment of the present disclosure, the apparatus 100 for predicting the performance of the vehicle NVH system based on the deep learning may effectively predict virtual interior noise.

Figure 2:
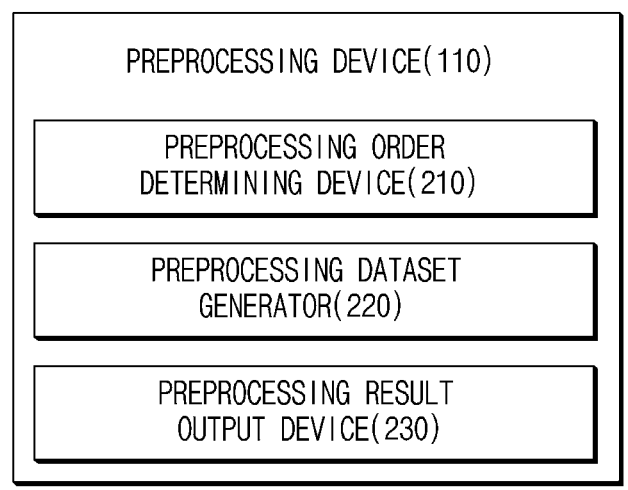
FIG. 2 is a block diagram illustrating a structure of the preprocessing device of FIG. 1.

FIG. 2 is a block diagram illustrating a structure of the preprocessing device of FIG. 1.

Referring to FIG. 2, the preprocessing device 110 may include a preprocessing order determining device 210, a learning dataset generator 220, and a preprocessing result output device 230.

The preprocessing order determining device 210 may load the collected learning data, may allow a user to select at least one learning target channel among all channels included in the loaded learning data, and may allow the user to set an order where the at least one selected learning target channel is preprocessed.

The preprocessing dataset generator 220 may generate one dataset where learning data corresponding to the learning target channel selected by the user is configured with an input and an output on a frequency domain in the order set by the user and may store the dataset as a file. Hereinafter, for convenience of description, the dataset generated by the preprocessing dataset generator 220 is referred to as a learning dataset.

The preprocessing dataset generator 220 may load a previously generated learning dataset depending on a user selection.

The preprocessing dataset generator 220 may perform preprocessing depending on the number of noise channels, the number of vibration channels, and the number of target channels, which are input by the user, to complete learning preparation.

The preprocessing result output device 230 may output a color map of the channel selected by the user based on the learning dataset generated by the preprocessing dataset generator 220. In other words, the user may identify the learning data generated for each channel in the form of a color map graph.

The preprocessing result output device 230 may receive a suitable range for a noise source, a vibration source, and an output from the user and may generate and output a color map for each channel corresponding to the received range.

As an example, the range may include a frequency range, a time range, and a value range, which correspond to a specific channel number of the noise source/the vibration source/the output. Herein, the channel number may be a preprocessing order of a learning target channel list.

Figure 3:
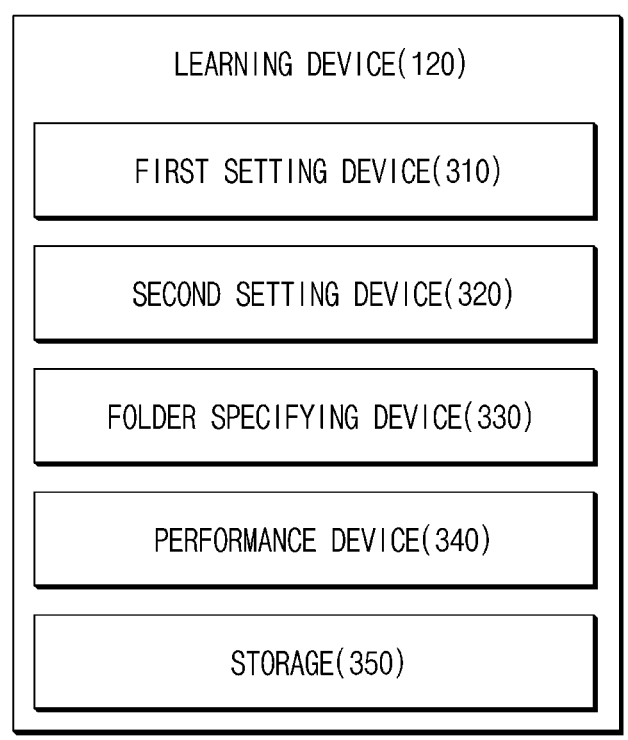
FIG. 3 is a block diagram illustrating a structure of the learning device of FIG. 1.

FIG. 3 is a block diagram illustrating a structure of the learning device of FIG. 1.

Referring to FIG. 3, the learning device 120 may include a first setting device 310, a second setting device 320, a folder specifying device 330, a performance device 340, and a storage 350.

The first setting device 310 may allow a user to set a default hyperparameter—that is, a model structure variable—.

Herein, the model structure variable may include the number of hidden layers for each of a noise layer, a vibration layer, and a target layer, the number of hidden nodes of each hidden layer, and a learning variable.

As an example, the learning variable may include epochs (the learned number of all datasets), save-epochs (the number of epochs when saving a model), batch size (the number of datasets where weights are updated and occurrence of back-propagation per batch size), or validation split (a rate at which it will be used as validation data, which is 0 to 1.0).

The second setting device 320 may allow the user to set an additional hyperparameter—that is, a training setting—.

As an example, the training setting may include an activation function, a weight initial value, a bias initial value, a learning algorithm, a learning rate, and a loss function.

As an example, the learning algorithm may be Nesterov accelerated adaptive moment estimation (Nadam), and the activation function may be a rectified linear unit (ReLU), and the loss function may be log(cos h(x)).

The folder specifying device 330 may allow the user to specify a default folder to store the result of learning the model.

When learning starts, a folder may be automatically generated according to a certain rule and a folder and a file including the result of learning the model may be generated and stored in the default folder specified by the user. As an example, the generated folder name may start with "Out_" and may include date and time when a corresponding folder is generated.

As the user inputs a learning start button, the performance device 340 may start learning. In this case, learning progress contents may be displayed on a command window.

Figure 4:
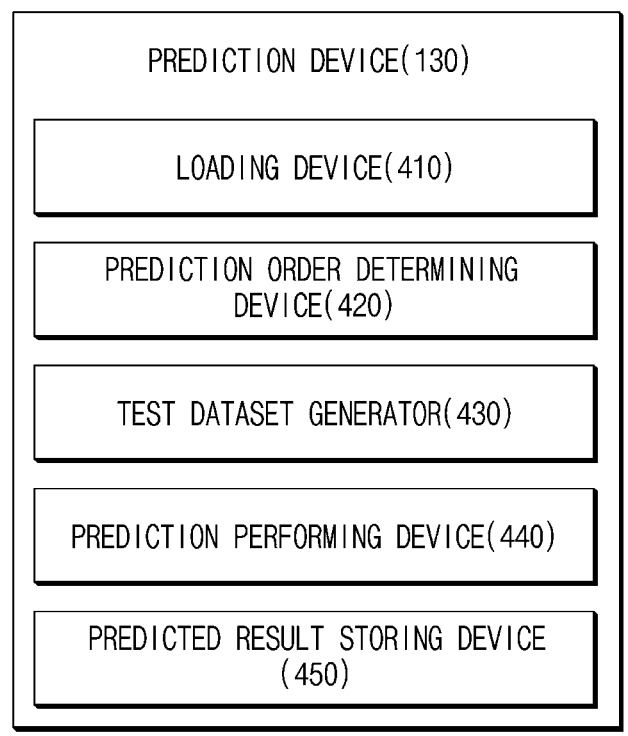
FIG. 4 is a block diagram illustrating a structure of the prediction device of FIG. 1.

FIG. 4 is a block diagram illustrating a structure of the prediction device of FIG. 1.

Referring to FIG. 4, the prediction device 130 may include a loading device 410, a prediction order determining device 420, a test dataset generator 430, a prediction performing device 440, and a predicted result storing device 450.

The loading device 410 may load a list of all channels and a dataset for test from a folder specified by a user.

The prediction order determining device 420 may allow the user to specify an order of prediction channels for all the channels corresponding to the test dataset.

As an example, the order of the prediction channels may be the same order as an order of learning channels—that is, a preprocessing order—or an order of names.

When the order of the prediction channels is determined, the prediction order determining device 420 may automatically output the number of the determined prediction channels on a corresponding screen.

The test dataset generator 430 may generate and store one test dataset in the order of the prediction channels.

The prediction performing device 440 may load a previously learned NVH system model specified by the user to perform performance prediction using the vehicle NVH system model.

The predicted result storing device 450 may store the predicted result in an output order.

Figure 5:
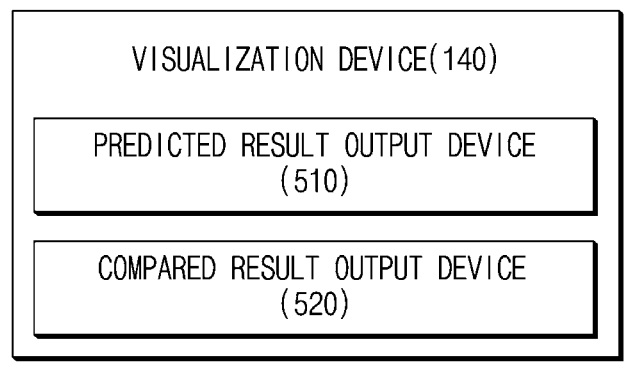
FIG. 5 is a block diagram illustrating a structure of the visualization device of FIG. 1.

FIG. 5 is a block diagram illustrating a structure of the visualization device of FIG. 1.

Referring to FIG. 5, a visualization device 140 may include a predicted result output device 510 and a compared result output device 520.

The predicted result output device 510 may visualize and output the result of predicting the performance as a color map on a frequency domain.

The predicted result output device 510 may generate and output a color map on which at least one of a color map type, an output type, a channel number, a frequency range, a time or RPM range, or an output value range is displayed.

The compared result output device 520 may compare an experimental result obtained by applying the same noise and vibration as the collected learning data to a real vehicle with the result of predicting the performance and may visualize and output the compared result.

Figure 6:
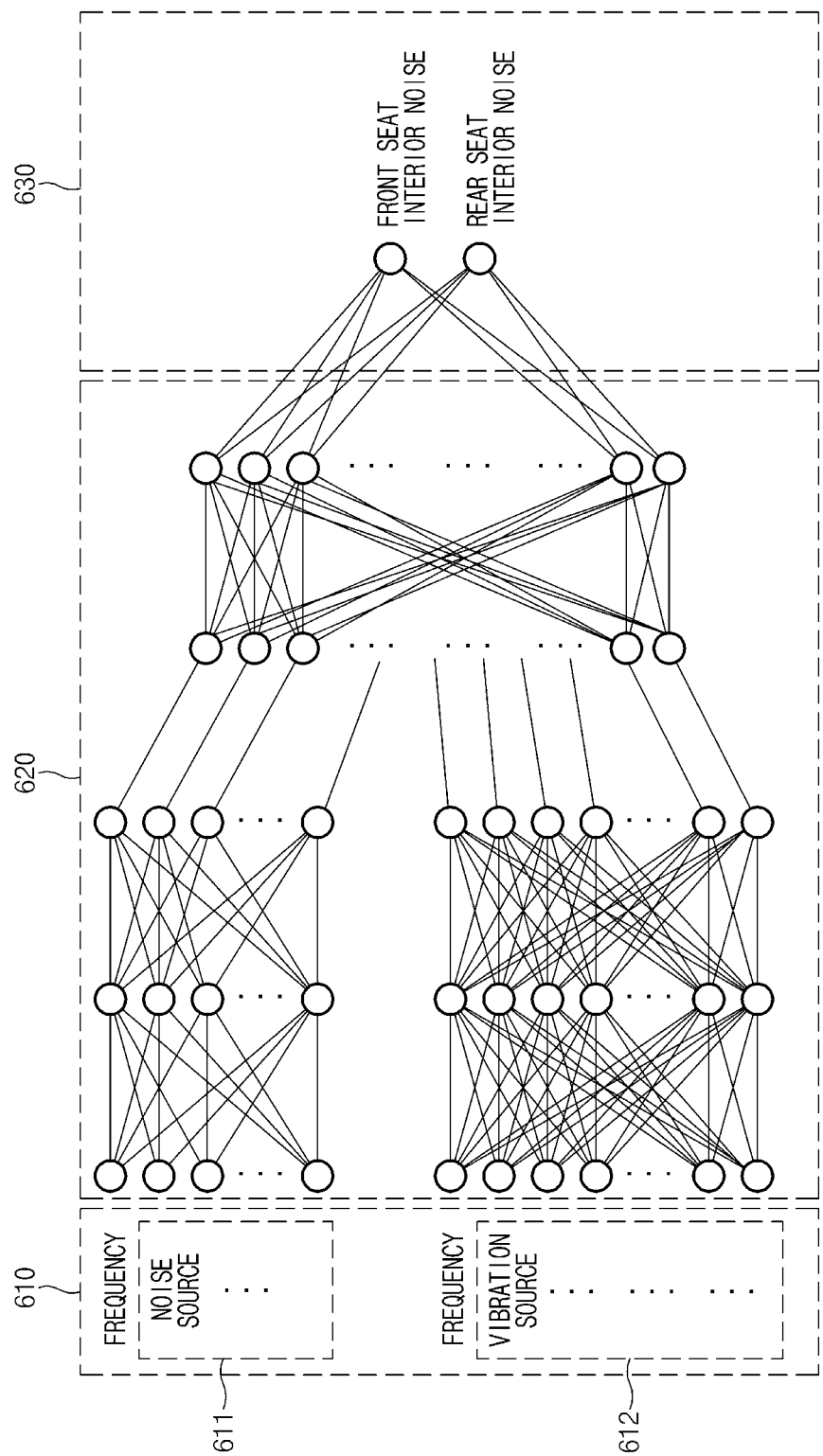
FIG. 6 is a drawing illustrating a vehicle NVH system model using an artificial neural network according to an embodiment of the present disclosure.

FIG. 6 is a drawing illustrating a vehicle NVH system model using an artificial neural network according to an embodiment of the present disclosure.

Referring to FIG. 6, a vehicle NVH system model 600 may be roughly composed of a source 610, a transfer system 620, and a response 630.

The source 610 may be roughly composed of a noise source 611 and a vibration source 612. Each of the noise source 611 and the vibration source 612 may have a corresponding frequency as an input variable.

The transfer system 620 may use an artificial neural network as the vehicle NVH system model 600. As an example, the artificial neural network may be a deep neural network (DNN) including a plurality of hidden layers between an input layer and an output layer.

As an embodiment, in a model which should include a noise source and a vibration source together, the artificial neural network may be implemented such that paths of the noise source 611 (air-borne) and the vibration source 612 (structure-borne) are divided and learned to the Nth hidden layer of the artificial neural network and are then combined and learned from the N+1th hidden layer by reflecting a characteristic when a noise and vibration transfer path is divided into the air-borne and the structure-borne to transfer noise and vibration. As an example, N may be set a value greater than 2—for example, 3—.

As an embodiment, for a model including only one of the noise source and the vibration source, the artificial neural network may be implemented to have a general artificial neural network structure without being divided and learned.

Figure 7:
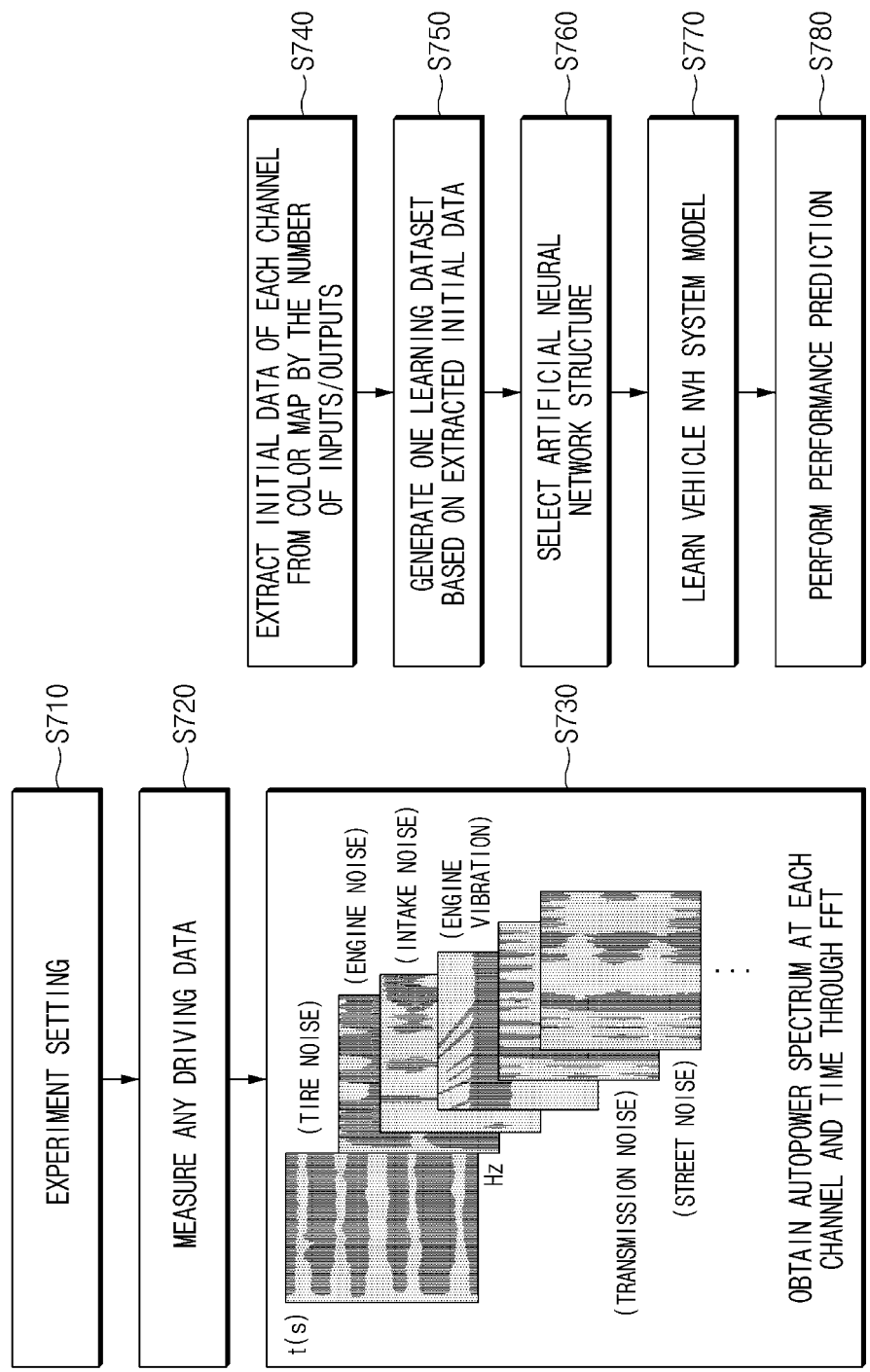
FIG. 7 is a flowchart illustrating an operation of an apparatus for predicting performance of a vehicle NVH system based on deep learning according to an embodiment of the present disclosure.

FIG. 7 is a flowchart illustrating an operation of an apparatus for predicting performance of a vehicle NVH system based on deep learning according to an embodiment of the present disclosure.

Referring to FIG. 7, an apparatus 100 for predicting performance may allow a user to select an NVH system to be established and select locations of an input sensor and an output sensor, which are suitable for the selected system. After the sensors are mounted on the selected locations, in S710, the apparatus 100 for predicting the performance may determine that an experimental setting procedure is completed.

Herein, each of the input sensor and the output sensor may include, but is not limited to, a microphone or an accelerometer.

When the experimental setting is completed, in S720, the apparatus 100 for predicting the performance may measure any driving data by reflecting various driving situations.

In S730, the apparatus 100 for predicting the performance may obtain an autopower spectrum (a color map) corresponding to each channel and time through FFT.

In S740, the apparatus 100 for predicting the performance may extract initial data of each channel from the color map by the number of inputs/outputs.

In S750, the apparatus 100 for predicting the performance may generate one learning dataset based on the extracted initial data.

In S760, the apparatus 100 for predicting the performance may select an artificial neural network structure based on the generated learning dataset.

As an example, when both of a noise source and a vibration source are included in the learning dataset, an artificial neural network structure where paths of the noise source and the vibration source are divided and learned to the Nth hidden layer of the artificial neural network and are combined and learned from the (N+1)th hidden layer may be selected. On the other hand, when the learning dataset includes only one of the noise source and the vibration source, an artificial neural network structure without being divided and learned may be selected.

In S770, the apparatus 100 for predicting the performance may learn a vehicle NVH system model based on the learning dataset and the selected artificial neural network.

In S780, the apparatus 100 for predicting the performance may perform performance prediction based on a test dataset and a previously learned model and may visualize and output the result of performing the performance prediction as a graph or the like.

The operations of the method or the algorithm described in connection with the embodiments disclosed herein may be embodied directly in hardware or a software module executed by a processor or in a combination thereof. The software module may reside on a non-transitory computer-readable storage medium (i.e., a memory and/or a storage) such as a RAM, a flash memory, a ROM, an EPROM, an EEPROM, a register, a hard disk, a removable disk, and a CD-ROM. In one example, the above-described apparatus 100 for predicting the performance may be implemented with a processor which is configured to perform the above-described operations when executing the software module stored in the storage medium. In one example, the preprocessing device 110 and the components thereof, the learning device 120 and the components thereof, the prediction device 130 and the components thereof, the visualization device 140 and the components thereof, each, or together, may be implemented with a processor which is configured to perform the corresponding operations when executing the software module stored in the storage medium.

The exemplary storage medium may be coupled to the processor, and the processor may read information out of the storage medium and may record information in the storage medium. Alternatively, the storage medium may be integrated with the processor. The processor and the storage medium may reside in an application specific integrated circuit (ASIC). The ASIC may reside within a user terminal. In another case, the processor and the storage medium may reside in the user terminal as separate components.

An embodiment of the present disclosure may provide a method for establishing a vehicle NVH system model and predicting performance of a vehicle NVH system based on deep learning using driving data and an apparatus therefor.

Furthermore, an embodiment of the present disclosure may provide a method for establishing a vehicle NVH system model and predicting performance of a vehicle NVH system based on deep learning, which is capable of minimizing waste of data by applying all driving data to learning and providing an efficient, data-friendly vehicle NVH system model by reflecting non-linear characteristics in a driving state, and an apparatus therefor.

Furthermore, an embodiment of the present disclosure may provide a method for establishing a vehicle NVH system model, which is capable of providing an NVH system model indicating a vehicle characteristic and/or a part characteristic using data upon driving without a process of previously checking characteristics of each of transfer paths.

Furthermore, an embodiment of the present disclosure may provide a method for establishing a vehicle NVH system model and predicting performance of a vehicle NVH system model, which is capable of quickly and simply identifying characteristics and performance of the entire vehicle NVH system through one monitoring.

Furthermore, an embodiment of the present disclosure may provide a method for establishing a vehicle NVH system model and predicting performance of a vehicle NVH system based on deep learning, which is capable of learning a vehicle NVH system model through fusion interpretation of an analytic technique and an experimental technique and performing performance prediction for the learned model, and an apparatus therefor.

In addition, various effects ascertained directly or indirectly through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A method for predicting performance of a vehicle noise, vibration and harshness (NVH) system based on deep learning, the method comprising:
   preprocessing, by a preprocessing device, learning data collected for each channel associated with noise and vibration while driving;
   learning, by a learning device, a model forming a correlation function between multiple inputs and multiple outputs corresponding to the preprocessed learning data using an artificial neural network; and
   predicting, by a prediction device, performance using a vehicle NVH system model established through the learned model,
   wherein the predicting of the performance using the vehicle NVH system model established through the learned model includes:
   loading a test dataset; and
   specifying an order of prediction channels for all channels corresponding to the test dataset.

2. The method of claim 1, wherein the preprocessing includes:
   receiving a first user input to set an order where at least one learning target channel selected among all channels is preprocessed;
   generating one learning dataset where the learning data corresponding to the selected learning target channel is configured with an input and an output on a frequency domain in the set order and storing the learning dataset as a file; and
   outputting a color map of a channel selected by a user based on the generated learning dataset.

3. The method of claim 2, wherein the artificial neural network is a deep neural network (DNN) including a plurality of hidden layers between an input layer and an output layer,
   wherein the learning of the model includes:
   receiving a second user input to set a default hyperparameter including a model structure variable;
   receiving a third user input to set an additional hyperparameter including a learning algorithm;
   receiving a fourth user input to specify a default folder to store the learned result;
   performing learning as a learning start button is input; and
   storing the learned vehicle NVH system model, and
   wherein the model structure variable includes the number of the hidden layers, the number of hidden nodes, and learning variables.

4. The method of claim 3, wherein paths of a noise source and a vibration source are divided and learned to the Nth hidden layer of the artificial neural network and are combined and learned from the (N+1)th hidden layer, when both the noise source and the vibration source are included in the input layer.

5. The method of claim 4, wherein the N is a value greater than 2.

6. The method of claim 4, wherein each of the noise source and the vibration source includes a frequency as one variable.

7. The method of claim 1, wherein the vehicle NVH system model includes a selectable separate performance model, an integrated performance model, and a universal deep learning model.

8. The method of claim 7, wherein the separate performance model includes an acceleration booming model and a road noise model.

9. The method of claim 1, further comprising:
   at least one of visualizing and outputting the result of predicting the performance as a color map on a frequency domain and visualizing and outputting the result of comparing an experimental result obtained by applying the same noise and vibration as the collected learning data to a real vehicle with the result of predicting the performance.

10. The method of claim 3, wherein the predicting of the performance using the vehicle NVH system model established through the learned model further includes:
    receiving a fifth user input to specify the order of prediction channels for all channels corresponding to the test dataset;
    generating and storing a test dataset in the order of the prediction channels;
    loading the vehicle NVH system model specified by the user and predicting the performance using the vehicle NVH system model; and
    storing the result of predicting the performance.

11. An apparatus for predicting performance of a vehicle NVH system based on deep learning, the apparatus comprising:
    a preprocessing device configured to preprocess learning data collected for each channel associated with noise and vibration while driving;

a learning device configured to learn a model forming a correlation function between multiple inputs and multiple outputs corresponding to the preprocessed learning data using an artificial neural network; and a prediction device configured to predict performance using a vehicle NVH system model established through the learned model, wherein the prediction device includes:
   a loading device configured to load a test dataset; and
   a prediction order determining device configured to specify an order of prediction channels for all channels corresponding to the test dataset.

12. The apparatus of claim 11, wherein the preprocessing device includes:
   a preprocessing order determining device configured to receive a first user input to set an order where at least one learning target channel selected by a user among all channels is preprocessed;
   a preprocessing dataset generator configured to generate one learning dataset where the learning data corresponding to the selected learning target channel is configured with an input and an output on a frequency domain in the set order and store the learning dataset as a file; and
   a preprocessing result output device configured to output a color map of a channel selected by the user based on the generated learning dataset.

13. The apparatus of claim 12, wherein the artificial neural network is a deep neural network (DNN) including a plurality of hidden layers between an input layer and an output layer,
wherein the learning device includes:
   a first setting device configured to receive a second user input to set a default hyperparameter including a model structure variable;
   a second setting device configured to receive a third user input to set an additional hyperparameter including a learning algorithm;
   a folder specifying device configured to receive a fourth user input to specify a default folder to store the learned result;
   a performance device configured to perform learning as a learning start button is input; and
   a storage storing the learned vehicle NVH system model, and wherein the model structure variable includes the number of the hidden layers, the number of hidden nodes, and learning variables.

14. The apparatus of claim 13, wherein paths of a noise source and a vibration source are divided and learned to the Nth hidden layer of the artificial neural network and are combined and learned from the (N+1)th hidden layer, when both the noise source and the vibration source are included in the input layer.

15. The apparatus of claim 14, wherein the N is a value greater than 2.

16. The apparatus of claim 14, wherein each of the noise source and the vibration source includes a frequency as one variable.

17. The apparatus of claim 11, wherein the vehicle NVH system model includes a selectable separate performance model, an integrated performance model, and a universal deep learning model.

18. The apparatus of claim 17, wherein the separate performance model includes an acceleration booming model and a road noise model.

19. The apparatus of claim 11, further comprising:
   a visualization device including:
   a predicted result output device configured to visualize and output the result of predicting the performance as a color map on a frequency domain; and
   a compared result output device configured to visualize and output the result of comparing an experimental result obtained by applying the same noise and vibration as the collected learning data to a real vehicle with the result of predicting the performance.

20. The apparatus of claim 13,
wherein the prediction order determining device is configured to receive a fifth user input to specify the order of prediction channels for all channels corresponding to the test dataset, and
the prediction device further includes:
   a test dataset generator configured to generate and store a test dataset in the order of the prediction channels;
   a prediction performing device configured to load the vehicle NVH system model specified by the user and predict the performance using the vehicle NVH system model; and
   a prediction result storing device configured to store the result of predicting the performance.

* * * * *